(12) United States Patent  
Fujita

(10) Patent No.: US 10,200,584 B2  
(45) Date of Patent: Feb. 5, 2019

(54) IMAGE CAPTURING APPARATUS, CONTROL METHOD OF IMAGE CAPTURING APPARATUS, AND PROGRAM

(71) Applicant: CANON KABUSHIKI KAISHA, Tokyo (JP)

(72) Inventor: Yusuke Fujita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 80 days.

(21) Appl. No.: 14/637,126

(22) Filed: Mar. 3, 2015

(65) Prior Publication Data

US 2015/0256766 A1 Sep. 10, 2015

(30) Foreign Application Priority Data

Mar. 7, 2014 (JP) ................................ 2014-045626

(51) Int. Cl.
*H04N 5/238* (2006.01)
*H04N 5/232* (2006.01)
*H04N 5/225* (2006.01)
*H04N 5/235* (2006.01)

(52) U.S. Cl.
CPC ....... *H04N 5/23206* (2013.01); *H04N 5/2254* (2013.01); *H04N 5/238* (2013.01); *H04N 5/2351* (2013.01); *G03B 2207/00* (2013.01); *H04N 5/23245* (2013.01)

(58) Field of Classification Search
CPC ............. H04N 5/23206; H04N 5/2254; H04N 5/2351; H04N 5/238
See application file for complete search history.

(56) References Cited

U.S. PATENT DOCUMENTS

| 4,437,111 A * | 3/1984 | Inai ........................ H04N 5/238 348/216.1 |
| 2003/0067387 A1* | 4/2003 | Kwon ................ G08B 13/1968 340/540 |
| 2006/0067209 A1 | 3/2006 | Sheehan et al. |

(Continued)

FOREIGN PATENT DOCUMENTS

| JP | 7-107355 A | 4/1995 |
| JP | 2014-003585 A | 1/2014 |

(Continued)

*Primary Examiner* — Christopher G Findley
(74) *Attorney, Agent, or Firm* — Canon U.S.A., Inc. I.P. Division

(57) ABSTRACT

An image-capturing apparatus includes an insertion and removal unit configured to insert and remove the infrared light cut filter to and from an optical path of the image-capturing optical system. An adjustment command capable of describing a brightness value of a brightness of the subject and a delay time for determining the brightness and capable of separately describing the brightness value in each of the cases where the infrared light cut filter is inserted into or removed from the optical path is received from the external apparatus via a network. A determination is made as to whether a content of an adjustment command matches a content stored in advance, and the brightness value and the delay time included in the adjustment command are converted into values that can be set in a case where the determination unit determines that the content of the adjustment command matches the content stored.

10 Claims, 13 Drawing Sheets

(56) References Cited

U.S. PATENT DOCUMENTS

| | | | |
|---|---|---|---|
| 2009/0009655 A1* | 1/2009 | Suda | H04N 5/235 |
| | | | 348/360 |
| 2012/0013765 A1* | 1/2012 | Maruyama | H04N 5/243 |
| | | | 348/223.1 |
| 2014/0152777 A1 | 6/2014 | Galor et al. | |
| 2015/0256722 A1 | 9/2015 | Haga | |

FOREIGN PATENT DOCUMENTS

| | | | |
|---|---|---|---|
| WO | WO2013175723 A1 * | 11/2013 | |
| WO | 2014/014838 A2 | 1/2014 | |

\* cited by examiner

FIG. 7A

```xml
<s:Body
 xmlns:xsi="http://www.w3.org/2001/XMLSchema-instance"
 xmlns:xsd="http://www.w3.org/2001/XMLSchema"
 xmlns:img20="http://www.onvif.org/ver20/schema">
  <GetOptionsResponse xmlns="http://www.onvif.org/ver20/imaging/wsdl">
    <ImagingOptions20>
    ......
      <img20:IrCutFilterModes>ON</img20:IrCutFilterModes>
      <img20:IrCutFilterModes>OFF</img20:IrCutFilterModes>
      <img20:IrCutFilterModes>AUTO</img20:IrCutFilterModes>
    ......
    </ImagingOptions20>
    <ImagingOptions20Extension>
    ......
    <ImagingOptions20Extension2>
      <IrCutFilterAutoAdjustmentOptions>
        <img20:Mode>Common</img20:Mode>
        <img20:Mode>ToOn</img20:Mode>
        <img20:Mode>ToOff</img20:Mode>
        <img20:BoundaryOffset>true</img20:BoundaryOffset>
        <img20:ResponseTime>
          <img20:Min>PT0S</img20:Min>
          <img20:Max>PT30M</img20:Max>
        </img20:ResponseTime>
      </IrCutFilterAutoAdjustmentOptions>
    </ImagingOptions20Extension2>
    ......
    </ImagingOptions20Extension>
  </GetOptionsResponse>
</s:Body>
```

FIG. 7B

```xml
<s:Body
xmlns:xsi="http://www.w3.org/2001/XMLSchema-instance"
xmlns:xsd="http://www.w3.org/2001/XMLSchema"
xmlns:img20="http://www.onvif.org/ver20/schema">
    <GetOptionsResponse xmlns="http://www.onvif.org/ver20/imaging/wsdl">
        <ImagingOptions20>
            ......
            <img20:IrCutFilterModes>ON</img20:IrCutFilterModes>
            <img20:IrCutFilterModes>OFF</img20:IrCutFilterModes>
            <img20:IrCutFilterModes>AUTO</img20:IrCutFilterModes>
            ......
        </ImagingOptions20>
        ......
        <ImagingOptions20Extension2>
            <IrCutFilterAutoAdjustmentOptions>
                <img20:Mode>Common</img20:Mode>
                <img20:BoundaryOffset>true</img20:BoundaryOffset>
                <img20:ResponseTime>
                    <img20:Min>PT0S</img20:Min>
                    <img20:Max>PT30M</img20:Max>
                </img20:ResponseTime>
            </IrCutFilterAutoAdjustmentOptions>
        </ImagingOptions20Extension2>
        ......
    </ImagingOptions20Extension>
    ......
    </GetOptionsResponse>
</s:Body>
```

FIG. 8A

```xml
<s:Body
xmlns:xsi="http://www.w3.org/2001/XMLSchema-instance"
xmlns:xsd="http://www.w3.org/2001/XMLSchema">
  <SetImagingSettings xmlns="http://www.onvif.org/ver20/imaging/wsdl">
    <VideoSourceToken>0</VideoSourceToken>
    <ImagingSettings>
      <IrCutFilter xmlns="http://www.onvif.org/ver10/schema">
        AUTO
      </IrCutFilter>
      <IrCutFilterAutoAdjustment>
        <BoundaryType>Common</BoundaryType>
        <BoundaryOffset>0.52</BoundaryOffset>
        <ResponseTime>PT1M15S</ResponseTime>
      </IrCutFilterAutoAdjustment>
    </ImagingSettings>
    <ForcePersistence>false</ForcePersistence>
  </SetImagingSettings>
</s:Body>
```

FIG. 8B

```xml
<s:Body
xmlns:xsi="http://www.w3.org/2001/XMLSchema-instance"
xmlns:xsd="http://www.w3.org/2001/XMLSchema">
  <SetImagingSettings xmlns="http://www.onvif.org/ver20/imaging/wsdl">
    <VideoSourceToken>0</VideoSourceToken>
    <ImagingSettings>
      <IrCutFilter xmlns="http://www.onvif.org/ver10/schema">
AUTO
      </IrCutFilter>
      <IrCutFilterAutoAdjustment>
        <BoundaryType>ToOn</BoundaryType>
        <BoundaryOffset>0.16</BoundaryOffset>
        <ResponseTime>PT1M30S</ResponseTime>
      </IrCutFilterAutoAdjustment>
      <IrCutFilterAutoAdjustment>
        <BoundaryType>ToOff</BoundaryType>
        <BoundaryOffset>0.25</BoundaryOffset>
        <ResponseTime>PT1M10S</ResponseTime>
      </IrCutFilterAutoAdjustment>
    </ImagingSettings>
    <ForcePersistence>false</ForcePersistence>
  </SetImagingSettings>
</s:Body>
```

FIG. 10A

| BoundaryOffset VALUE THAT CAN BE SET | -1 , -0.5 , 0 , 0.5 , 1 |
|---|---|

FIG. 10B

| BoundaryOffset VALUE OF REQUEST | -1 ~ -0.75 | -0.75 ~ -0.25 | -0.25 ~ 0.25 | 0.25 ~ 0.75 | 0.75 ~ 1 |
|---|---|---|---|---|---|
| BoundaryOffset VALUE THAT IS SET IN IMAGE-CAPTURING APPARATUS | -1 | -0.5 | 0 | 0.5 | 1 |

FIG. 11A

| ResponseTime VALUE THAT CAN BE SET | 1S, 10S, 30S, 1M, 3M |
|---|---|

FIG. 11B

| ResponseTime VALUE OF REQUEST | 1S ~ 9S | 10S ~ 29S | 30S ~ 59S | 1M ~ 2M59S | 3M ~ |
|---|---|---|---|---|---|
| ResponseTime VALUE THAT IS SET IN IMAGE-CAPTURING APPARATUS | 1S | 10S | 30S | 1M | 3M |

IMAGE CAPTURING APPARATUS, CONTROL METHOD OF IMAGE CAPTURING APPARATUS, AND PROGRAM

BACKGROUND OF THE INVENTION

Field of the Invention

The present inventions relate to at least one image-capturing apparatus, at least one control method of an image-capturing apparatus, at least one program and at least one storage medium. More particularly, the present inventions relate to a technique for inserting and removing an infrared light cut filter into and from an optical path of an image-capturing optical system.

Description of the Related Art

In the past, an image-capturing apparatus configured to switch visible light image-capturing and infrared light image-capturing by inserting or removing an infrared light cut filter into and from an optical path of an image-capturing optical system has been known. In this case, the visible light image-capturing unit that an image-capturing apparatus captures an image of a subject while the infrared light cut filter is inserted into the optical path of the image-capturing optical system. On the other hand, the infrared light image-capturing unit that an image-capturing apparatus captures an image of a subject while the infrared light cut filter is removed from the optical path of the image-capturing optical system.

Japanese Patent Application Laid-Open No. H 7-107355 discloses an image-capturing apparatus that controls insertion and removal of the infrared light cut filter into and from the optical path of the image-capturing optical system by determining the brightness of the external environment.

With the rapid spread of network techniques, the user's needs for controlling an image-capturing apparatus via a network from an external apparatus are rising. In this rise of the needs, the control of the insertion and removal of the infrared light cut filter into and from the optical path of the image-capturing optical system is not the exception.

However, in Japanese Patent Application Laid-Open No. H 7-107355, the settings of the control of the insertion and removal of the infrared light cut filter into and from the optical path of the image-capturing optical system are not expected to be configured via a network from an external apparatus. Further, in the future, it is expected that users may desire, as such settings, the brightness of the subject of the image-capturing apparatus and a delay time for insertion and removal of the infrared light cut filter into and from the optical path of the image-capturing optical system.

However, such settings may not be necessarily appropriately configured from an external apparatus. For example, if such settings are not configured appropriately, the infrared light cut filter may be inserted into the optical path of the image-capturing optical system even though the brightness of the subject of the image-capturing apparatus is low, and this subject in the captured image may be underexposed. Alternatively, the infrared light cut filter may be removed from the optical path even though the brightness is high, and this subject in the captured image may be overexposed.

SUMMARY OF THE INVENTION

At least one image-capturing apparatus in which a setting of insertion and removal of an infrared light cut filter into and from an optical path of an image-capturing optical system can be set appropriately from an external apparatus, at least one control method of the at least one image-capturing apparatus, at least one program and at least one storage medium are provided and discussed herein.

At least one image-capturing apparatus according to the present inventions is an image-capturing apparatus communicating with an external apparatus via a network and including an image-capturing optical system, an image-capturing unit configured to capture an image of a subject by the image-capturing optical system, an infrared light cut filter configured to cut off infrared light, an insertion and removal unit configured to insert and remove the infrared light cut filter to and from an optical path of the image-capturing optical system, a reception unit configured to receive, from the external apparatus via a network, an adjustment command capable of describing a brightness value of a brightness of the subject and a delay time for determining the brightness and capable of separately describing the brightness value in each of the cases where the infrared light cut filter is inserted into the optical path and the infrared light cut filter is removed from the optical path, a determination unit configured to determine whether a content of an adjustment command received by the reception unit matches a content stored in advance in the image-capturing apparatus, and a conversion unit configured to convert the brightness value and the delay time included in the adjustment command into values that can be set in the image-capturing apparatus in a case where the determination unit determines that the content of the adjustment command received by the reception unit matches the content stored in advance in the image-capturing apparatus.

According to other aspects of the present inventions, other apparatuses, methods, programs and storage mediums are discussed herein. Further features of the present inventions will become apparent from the following description of exemplary embodiments (with reference to the attached drawings).

BRIEF DESCRIPTION OF THE DRAWINGS

FIGS. 7A and 7B are figures illustrating an example of at least one configuration of GetOptionsResponse according to the first embodiment of the present inventions.

FIGS. 8A and 8B are figures illustrating an example of at least one configuration of SetImagingSettings according to the first embodiment of the present inventions.

FIGS. 10A and 10B are figures illustrating an example of setting processing of at least one embodiment of BoundaryOffset value in at least one image-capturing apparatus according to the first embodiment of the present inventions.

FIGS. 11A and 11B are figures illustrating an example of setting processing of at least one embodiment of ResponseTime value in at least one image-capturing apparatus according to the first embodiment of the present inventions.

DESCRIPTION OF THE EMBODIMENTS

Figure 1:
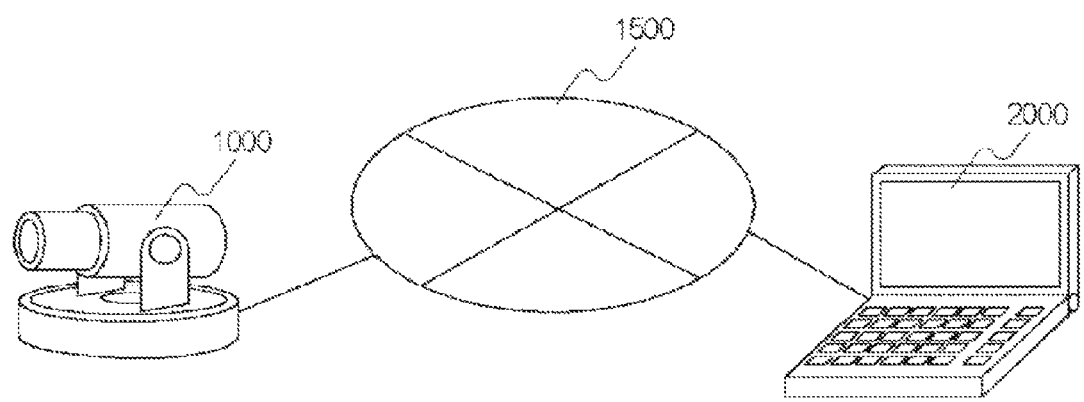
FIG. 1 is a figure illustrating an example of a system configuration of a monitoring system according to a first embodiment of the present inventions.

Hereinafter, an embodiment of the present inventions will be explained in details with reference to drawings. The configuration shown in the following embodiment is merely an example, and the present inventions are not limited to the configuration(s) shown in the drawings.

Commands in the following embodiment are considered to be defined, for example, on the basis of Open Network Video Interface Forum (which may be hereinafter referred to as ONVIF) standard. In the ONVIF standard, for example, the commands are defined by using XML Schema Definition language (which may be hereinafter referred to as XSD).

First Embodiment

Hereinafter, a network configuration according to the present embodiment will be explained with reference to FIG. 1. More specifically, FIG. 1 is a figure illustrating an example of a system configuration of a monitoring system according to the present embodiment.

In a monitoring system according to the present embodiment, an image-capturing apparatus 1000 and a client apparatus 2000 are connected to be able to communicate with each other via an IP network circuit 1500 (via a network). Therefore, the image-capturing apparatus 1000 can distribute a captured image via the IP network circuit 1500 to the client apparatus 2000.

The image-capturing apparatus 1000 according to the present embodiment is a monitoring camera for capturing a motion image. More specifically, the image-capturing apparatus 1000 according to the present embodiment is considered to be a network camera used for monitoring. The client apparatus 2000 according to the present embodiment is an example of an external apparatus such as a PC. The monitoring system according to the present embodiment corresponds to an image-capturing system.

The IP network 1500 is constituted by multiple routers, switches, cables, and the like satisfying a communication standard, for example, Ethernet (registered trademark). However, in the present embodiment, the communication standard, the size, and the configuration thereof are not particularly limited as long as communication can be performed between the image-capturing apparatus 1000 and the client apparatus 2000.

For example, the IP network circuit 1500 may be constituted by the Internet, a wired LAN (Local Area Network), a wireless LAN (Wireless LAN), a WAN (Wide Area Network), and the like. It should be noted that the image-capturing apparatus 1000 according to the present embodiment may support, for example, a PoE (Power Over Ethernet (registered trademark)), and an electric power may be provided to the image-capturing apparatus 1000 according to the present embodiment via a LAN cable.

The client apparatus 2000 transmits various kinds of commands to the image-capturing apparatus 1000. These commands are, for example, a command for changing the image-capturing direction and the angle of view of the image-capturing apparatus 1000, and command for changing an image-capturing parameter, a command for starting streaming a captured image, and the like.

On the other hand, the image-capturing apparatus 1000 transmits a response to such command and a stream of captured images to the client apparatus 2000. It should be noted that the image-capturing apparatus 1000 changes the angle of view in accordance with a command for changing the angle of view received from the client apparatus 2000.

Figure 2:
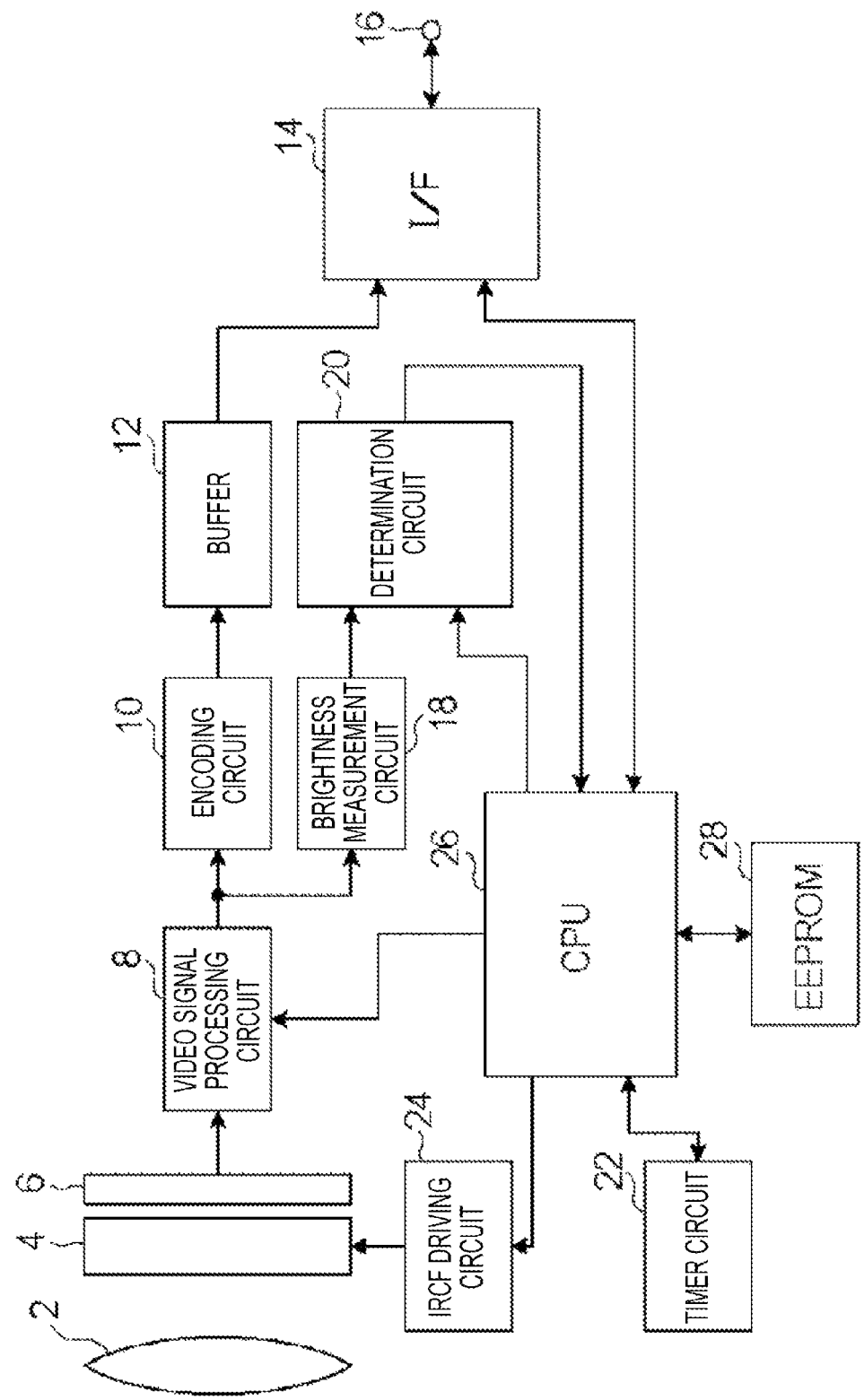
FIG. 2 is a figure illustrating an example of a hardware configuration of at least one image-capturing apparatus according to a first embodiment of the present inventions.

Subsequently, FIG. 2 is a figure illustrating an example of a hardware configuration of the image-capturing apparatus 1000 according to the present embodiment. The image-capturing optical system 2 in FIG. 2 forms an image of a subjected captured by the image-capturing apparatus 1000 onto an image-capturing element 6 via an infrared light cut filter 4 (Infrared Cut Filter, which may hereinafter referred to as IRCF).

The IRCF 4 for cutting off infrared light is inserted into or removed from an optical path between the image-capturing optical system 2 and the image-capturing element 6 by a driving mechanism, not shown on the basis of a driving signal given by an IRCF driving circuit 24. This image-capturing element 6 is constituted by a CCD, a CMOS, and the like. Then, the image-capturing element 6 captures an image of a subject by the image-capturing optical system 2. Further, the image-capturing element 6 photoelectrically converts a captured image of a subject, thus outputting a captured image.

The image-capturing element 6 according to the present embodiment corresponds to an image-capturing unit capturing an image of a subject by the image-capturing optical system 2.

In accordance with an instruction given by a central processing circuit explained later (which may be hereinafter referred to as CPU) 26, the video signal processing circuit 8 outputs the brightness signal of the captured image which is output from the image-capturing element 6 or the brightness signal and the color-difference signal of the captured image which is output from the image-capturing element 6 to the encoding circuit 10. In accordance with an instruction given by the CPU 26, the video signal processing circuit 8 outputs the brightness signal of the captured image, which is output from the image-capturing element 6, to the brightness measurement circuit 18.

In a case where the video signal processing circuit 8 outputs only the brightness signal, the encoding circuit 10 compresses and encodes this output brightness signal, and outputs the brightness signal, which has been compressed and encoded, to the buffer 12 as a captured image. On the other hand, when the video signal processing circuit 8 outputs the brightness signal and the color-difference signal, the encoding circuit 10 compresses and encodes the brightness signal and color-difference signal, which have been output, and outputs the brightness signal and the color-difference signal, which have been compressed and encoded, as a captured image to the buffer 12.

The buffer 12 buffers a captured image which is output from the encoding circuit 10. Then, the buffer 12 outputs the buffered captured image to the communication circuit (which may be hereinafter referred to as I/F) 14. This I/F 14 packetizes the captured image which is output from the buffer 12, and transmits the packetized captured image via the communication terminal 16 to the client apparatus 2000. In this case, the communication terminal 16 is constituted by a LAN terminal and the like connected to the LAN cable.

It should be noted that the I/F 14 corresponds to a reception unit receiving a command for inserting and removing the IRCF 4 from the external client apparatus 2000.

The brightness measurement circuit 18 measures the brightness value of the current subject of the image-capturing apparatus 1000 on the basis of the brightness signal which is output from the video signal processing circuit 8. Then, the brightness measurement circuit 18 outputs the measured brightness value to the determination circuit 20. The determination circuit 20 compares the brightness value of the subject which is output from the brightness measurement circuit 18 and the threshold value of the brightness of the subject which is set by the CPU 26, and outputs the result of this comparison to the CPU 26.

The timer circuit 22 has a delay time which is set by the CPU 26. In accordance with an instruction for start of the timer given by the CPU 26, the timer circuit measures a time elapsed since this instruction was received. Then, when the delay time which has been set elapses, the timer circuit 22 outputs a signal indicating the elapse of the delay time to the CPU 26.

Upon receiving an instruction of the CPU 26, the IRCF driving circuit 24 removes the IRCF 4 from the optical path of the image-capturing optical system 2. Upon receiving an instruction of the CPU 26, the IRCF driving circuit 24 inserts the IRCF 4 into the optical path of the image-capturing optical system 2. The IRCF driving circuit according to the present embodiment corresponds to an insertion and removal unit for inserting and removing the IRCF 4 into and from the optical path of the image-capturing optical system 2.

The CPU 26 centrally controls each constituent element of the image-capturing apparatus 1000. The CPU 26 executes a program stored in nonvolatile memory that can electrically erase data (Electrically Erasable Programmable Read Only Memory, which may be hereinafter referred to as EEPROM) 28. Alternatively, the CPU 26 may perform control using hardware.

When the I/F 14 receives an insertion instruction command for commanding an insertion of the IRCF 4 into the optical path of the image-capturing optical system 2, the CPU 26 receives an insertion instruction command having been subjected to appropriate packet processing by the I/F 14. Subsequently, the CPU 26 analyzes the received insertion instruction command. The CPU 26 instructs the IRCF driving circuit 24 to insert the IRCF 4 into the optical path of the image-capturing optical system 2 on the basis of the result of this analysis.

In this case, in the present embodiment, image-capturing of a subject performed by the image-capturing apparatus 1000 while the IRCF 4 inserted into the optical path of the image-capturing optical system 2 will be referred to as visible light image-capturing (normal image-capturing). More specifically, in the visible light image-capturing, the image-capturing apparatus 1000 captures an image of this subject while light from the subject is incident upon the image-capturing element 6 via the IRCF 4.

When the image-capturing apparatus 1000 performs the visible light image-capturing, the CPU 26 gives an instruction to the video signal processing circuit 8 by placing importance on the color reproducibility of the captured image which is output from the image-capturing element 6, and outputs the brightness signal and the color-difference signal to the encoding circuit 10. As a result, the I/F 14 distributes the color captured image. Therefore, in the present embodiment, when the image-capturing apparatus 1000 captures the visible light image-capturing, this may be referred to as a case where the image-capturing mode of the image-capturing apparatus 1000 is a color mode.

When the I/F 14 receives a removal instruction command for instructing the IRCF 4 to be removed from the optical path of the image-capturing optical system 2, the CPU 26 inputs a removal instruction command having been subjected to appropriate packet processing by the I/F 14. Subsequently, the CPU 26 analyzes the input removal instruction command. Then, the CPU 26 instructs the IRCF driving circuit 24 to remove the IRCF 4 from the optical path of the image-capturing optical system 2 on the basis of the result of this analysis.

In this case, in the present embodiment, when the image-capturing apparatus 1000 captures an image of a subject while the IRCF 4 is removed from the optical path of the image-capturing optical system 2, this will be referred to as infrared light image-capturing. More specifically, in the infrared light image-capturing, the image-capturing apparatus 1000 captures an image of the subject while the light from the subject is incident upon the image-capturing element 6 without passing through the IRCF 4.

When the image-capturing apparatus 1000 performs the infrared light image-capturing, the color balance of the captured image that is output from the image-capturing element 6 is lost, and the CPU 26 instructs the video signal processing circuit 8 to output only the brightness signal to the encoding circuit 10. As a result, the I/F 14 distributes the black/white captured image. Therefore, in the present embodiment, when the image-capturing apparatus 1000 performs the infrared light image-capturing, this may be referred to as a case where the image-capturing mode of the image-capturing apparatus 1000 is a black/white mode.

Then, when the I/F 14 receives an automatic insertion and removal command for causing the image-capturing apparatus 1000 to automatically control insertion and removal of the IRCF 4 into and from the optical path of the image-capturing optical system 2, the CPU 26 receives an automatic insertion and removal command having been subjected to appropriate packet processing by the I/F 14. Subsequently, the CPU 26 analyzes the received automatic insertion and removal command.

In this case, the automatic insertion and removal command can describe an adjustment parameter of insertion and removal of the IRCF 4. This adjustment parameter may be omitted. This adjustment parameter is, for example, a parameter representing a brightness value. When the automatic insertion and removal command which is input from the I/F 14 describes a parameter indicating a brightness value, the CPU 26 sets, in the determination circuit 20, the brightness threshold value corresponding to the parameter described therein.

On the other hand, when the automatic insertion and removal command which is input from the I/F 14 does not describe a parameter indicating a brightness value, the CPU reads the brightness threshold value stored in the EEPROM 28 in advance from the EEPROM 28, and sets the read brightness threshold value in the determination circuit 20.

For example, when the determination circuit 20 determines that the brightness of the current subject is more than the brightness threshold value set by the CPU 26, the CPU 26 instructs the IRCF driving circuit 24 to insert the IRCF 4 into the optical path of the image-capturing optical system 2.

On the other hand, when the determination circuit 20 determines that the brightness of the current subject is not more than the brightness threshold value set by the CPU 26, the CPU 26 instructs the IRCF driving circuit 24 to remove the IRCF 4 from the optical path of the image-capturing optical system 2.

Further, the adjustment parameter of the insertion and removal of the IRCF 4 is, for example, a parameter indicating a delay time. When the automatic insertion and removal command which is input from the I/F has a parameter indicating a delay time described therein, the CPU 26 sets, in the timer circuit 22, the delay time corresponding to the parameter described herein.

On the other hand, when the automatic insertion and removal command which is input from the I/F 14 does not have a parameter indicating a delay time described therein, the CPU 26 reads the delay time stored in the EEPROM 28 in advance from the EEPROM 28, and sets the read delay time in the timer circuit 22.

For example, when the determination circuit 20 determines that the brightness of the current subject is more than the brightness threshold value which has been set by the CPU 26, the CPU 26 instructs the timer circuit 22 to start the timer. Then, when the CPU 26 receives a signal indicating the elapse of the delay time from the timer circuit 22, the CPU 26 instructs the IRCF driving circuit 24 to insert the IRCF 4 into the optical path of the image-capturing optical system 2.

When the determination circuit 20 determines that the brightness of the current subject is not more than the brightness threshold value which has been set by the CPU 26, the CPU 26 instructs the timer circuit 22 to start the timer. Then, when the CPU 26 receives a signal indicating the elapse of the delay time from the timer circuit 22, the CPU 26 instructs the IRCF driving circuit 24 to remove the IRCF 4 from the optical path of the image-capturing optical system 2.

When the automatic insertion and removal command which is input from the I/F 14 does not have the parameter indicating the delay time described therein, the CPU 26 may set a delay time indicating "0" in the timer circuit 22, or may not set any delay time in the timer circuit 22. Therefore, the CPU 26 can immediately instruct the IRCF driving circuit 24 to insert or remove the IRCF 4 in accordance with the determination result of the determination circuit 20.

The automatic insertion and removal command according to the present embodiment corresponds to an adjustment command which can describe a brightness value of the brightness of a subject.

Figure 3:
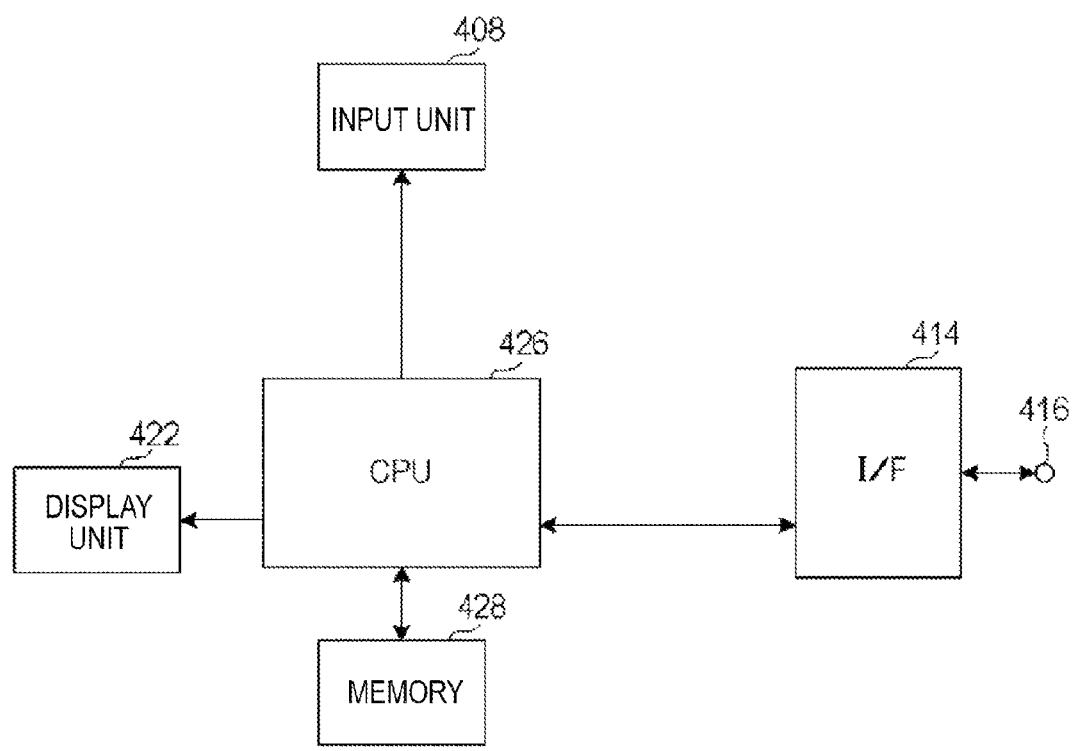
FIG. 3 is a figure illustrating an example of a hardware configuration of at least one client apparatus according to the first embodiment of the present inventions.

Subsequently, FIG. 3 is a figure illustrating an example of a hardware configuration of the client apparatus 2000 according to the present embodiment. It should be noted that the client apparatus 2000 according to the present embodiment is configured as a computer apparatus connected to the IP network circuit 1500. In a typical case, the client apparatus 2000 according to the present embodiment is a general-purpose computer such as a personal computer (which may be hereinafter referred to as PC).

The CPU 426 in FIG. 3 centrally controls each constituent element of the client apparatus 2000. The CPU 426 executes a program stored in a memory 428 explained later. Alternatively, the CPU 426 may perform control using hardware. The memory 428 is used as a storage area for programs executed by the CPU 426, a work area used during execution of a program, and a storage area of data.

The digital interface unit (which may be hereinafter referred to as I/F) 414 receives an instruction of the CPU 426, and transmits a command and the like to the image-capturing apparatus 1000 via the communication terminal 416. The I/F 414 receives a response to a command, a captured image distributed by streaming, and the like, from the image-capturing apparatus 1000 via the communication terminal 416. It should be noted that the communication terminal 416 is constituted by a LAN terminal and the like connected to a LAN cable.

The input unit 408 is constituted by, for example, buttons, an arrow key, a touch panel, a mouse, and the like. This input unit 408 receives an input of an instruction from a user. For example, the input unit 408 can receive, as an instruction from a user, an input of transmission instructions of various kinds of command given to the image-capturing apparatus 1000.

When the input unit 408 receives a command transmission instruction for the image-capturing apparatus 1000 from the user, the input unit 408 notifies the CPU 426 that the command transmission instruction is received. Then, the CPU 426 generates a command for the image-capturing apparatus 1000 in accordance with the instruction received by the input unit 408. Subsequently, the CPU 426 instructs a digital interface unit 414 to transmit the generated command to the image-capturing apparatus 1000.

Further, the input unit 408 can receive an input of a response of a user in reply to an inquiry message and the like given to the user which is generated when the CPU 426 executes a program stored in the memory 428.

In this case, the CPU 426 decodes and decompresses a captured image which is output from the I/F 414. Then, the CPU 426 outputs the decoded and decompressed captured image to the display unit 422. Therefore, the display unit 422 displays an image corresponding to the captured image which is output from the CPU 426.

It should be noted that the display unit 422 can display an inquiry message and the like for a user which is generated when the control unit 2001 executes a program stored in the storage unit 2002. The display unit 422 according to the present embodiment may be, e.g., a liquid crystal display apparatus, a plasma display indication apparatus, and a cathode ray tube (which may be hereinafter referred to as CRT) display apparatus such as a cathode-ray tube.

Each of internal configurations of the image-capturing apparatus 1000 and the client apparatus 2000 has been hereinabove explained, but the processing blocks in FIGS. 2 and 3 explain preferred embodiments of the image-capturing apparatus and the external apparatus according to the present inventions, and are not limited thereto. Various modifications and changes can be made within the range of the gist of the present inventions, and for example, an audio input unit and an audio output unit may be provided.

Figure 4:
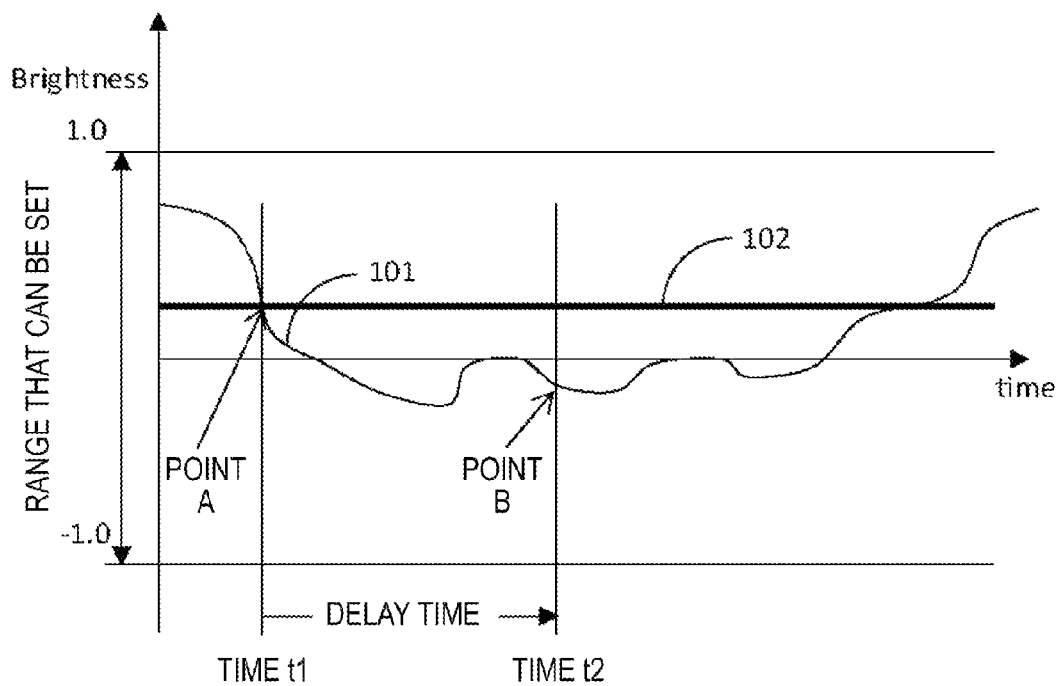
FIG. 4 is a time transition diagram of brightness for illustrating an example of operation of at least one image-capturing apparatus according to the first embodiment of the present inventions.

Subsequently, FIG. 4 explains an operation of the image-capturing apparatus 1000 according to the present embodiment when a brightness threshold value and a delay time parameter are set. The graph 101 in FIG. 4 illustrates a temporal change of the brightness of a subject of the image-capturing apparatus 1000. The graph 101 shows that the brightness of the subject decreases as the time passes in a sunset, and the brightness of the subject increases as the time passes in a sunrise.

The brightness threshold value 102 indicates a brightness threshold value used to determine whether the IRCF 4 is to be inserted into or removed from the optical path of the image-capturing optical system 2.

In the present embodiment, the brightness threshold value described in the automatic insertion and removal command is normalized to a value in a predetermined range. More specifically, this brightness threshold value is limited to a value from −1.0 to +1.0. Therefore, as shown in FIG. 4, the range of the brightness threshold value 102 that can be designated is a range from −1.0 to +1.0.

For example, as shown in FIG. 4, when the brightness value of the subject decreases, and this brightness value becomes less than the brightness threshold value 102, then the CPU 26 sets the delay time in the timer circuit 22, and instructs the timer circuit 22 to start the timer. As a result, the timer circuit 22 starts the timer.

In FIG. 4, at a point A, the brightness value of the subject is less than the brightness threshold value 102. The time when the brightness value of the subject becomes less than the brightness threshold value 102 is t1. When the brightness value of the subject becomes less than the brightness threshold value 102, the CPU 26 sets the delay time in the timer circuit 22, and the CPU 26 does not remove the IRCF 4 from the optical path of the image-capturing optical system 2 to leave the IRCF 4 inserted in the optical path of the image-capturing optical system 2 until the delay time that has been set passes.

Because of such operation of the CPU 26, even if the graph 101 frequently crosses the brightness threshold value 103, the image-capturing apparatus 1000 is prevented from frequently switching between the visible light image-capturing and the infrared light image-capturing. In addition, because of such operation, the chance of the brightness value of the subject being less than the brightness threshold value 103 can be increased in a stable manner. Such operation is also effective when there is an effect of flickering of lighting such as a fluorescent light.

Then, when the delay time that has been set in the timer circuit 22 passes and the time becomes t2, the CPU 26 instructs the IRCF driving circuit 24 to remove the IRCF 4 from the optical path of the image-capturing optical system 2. Therefore, the image-capturing apparatus 1000 performs the infrared light image-capturing. At this occasion (time t2), the brightness value of the subject is a point B.

As described above in the present embodiment, the user operates the client apparatus 2000, so that the automatic insertion and removal command describing the adjustment parameter of the insertion and removal of the IRCF 4 can be transmitted to the image-capturing apparatus 1000. In this case, the adjustment parameter includes a parameter indicating the brightness of the subject and a parameter indicating the delay time.

Therefore, even when the brightness value of the subject is around the brightness threshold value, the image-capturing apparatus 1000 having received the automatic insertion and removal command is prevented from frequently inserting and removing the IRCF 4 into and from the optical path of the image-capturing optical system 2. Even when the brightness of the subject frequently changes because of flickering of lighting, the image-capturing apparatus 1000 can prevent the IRCF 4 from being inserted into and removed from the optical path of the image-capturing optical system 2.

Figure 5:
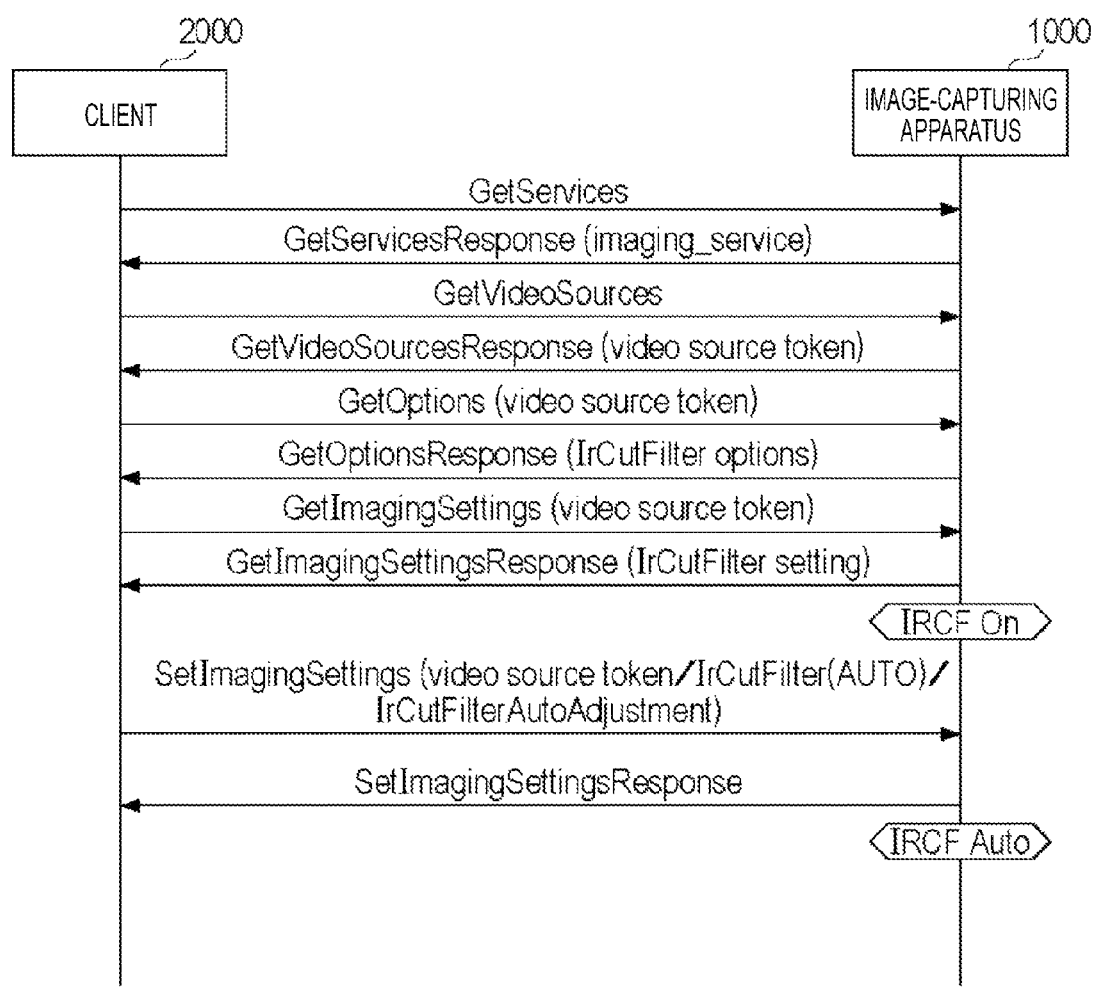
FIG. 5 is a figure for explaining a command sequence of at least on image-capturing apparatus and at least one client apparatus according to the first embodiment of the present inventions.

Subsequently, FIG. 5 is a sequence diagram for explaining a typical command sequence for setting an adjustment parameter of insertion and removal of the IRCF 4 between the image-capturing apparatus 1000 and the client apparatus 2000 according to the present embodiment. FIG. 5 describes transactions of commands using a so-called message sequence chart defined by ITU-T Recommendation Z.120 standard.

In the present embodiment, a transaction means a pair of a command transmitted from the client apparatus 2000 to the image-capturing apparatus 1000 and a response replied in response thereto from the image-capturing apparatus 1000 to the client apparatus 2000. In FIG. 5, it is considered that the image-capturing apparatus 1000 and the client apparatus 2000 are connected via an IP network circuit 1500.

Subsequently, with a transaction of GetServices, the client apparatus 2000 can acquire the types of Web services supported (provided) by the image-capturing apparatus 1000 and an address URI for using each Web service.

More specifically, the client apparatus 2000 transmits a command of GetServices to the image-capturing apparatus 1000. With this command, the client apparatus 2000 can acquire information indicating whether the image-capturing apparatus 1000 supports ImagingService in order to determine whether the image-capturing apparatus 1000 can execute an automatic insertion and removal command and the like.

On the other hand, the image-capturing apparatus 1000 having received this command replies a response to this command. In the present embodiment, this response indicates that the image-capturing apparatus 1000 supports ImagingService. It should be noted that ImagingService is a service for performing, e.g., setting of insertion and removal of the IRCF 4.

Subsequently, with a transaction of GetVideoSources, the client apparatus 2000 acquires a list of VideoSource held in the image-capturing apparatus 1000.

In this case, VideoSource is a set of parameters indicating the performance of a single image-capturing element 6 provided in the image-capturing apparatus 1000. For example, VideoSource includes VideoSourceToken which is an ID of VideoSource and Resolution indicating the resolution of a captured image that can be output by the image-capturing element 6.

The client apparatus 2000 transmits a command of GetVideoSources to the image-capturing apparatus 1000. With this command, the client apparatus 2000 can acquire VideoSourceToken indicating VideoSource for which a setting can be configured with regard to the insertion and removal of the IRCF 4.

Then, the image-capturing apparatus 1000 having received GetVideoSources command replies a response to this command to the client apparatus 2000. In the present embodiment, this response includes VideoSourceToken indicating VideoSource corresponding to the image-capturing element 6.

Subsequently, with a transaction of GetOptions, the client apparatus 2000 can acquire from the image-capturing apparatus 1000, information about commands that can be executed by the image-capturing apparatus 1000 from among an insertion command, a removal command, and an automatic insertion and removal command. With this transaction, the client apparatus 2000 acquires information indicating the adjustment parameter that can describe the automatic insertion and removal command.

The client apparatus 2000 transmits the command GetOptions to the image-capturing apparatus 1000 (i.e., an address URI for using ImagingService of the image-capturing apparatus 1000). This command includes VideoSourceToken included in a response of GetVideoSource received from the image-capturing apparatus 1000.

On the other hand, the image-capturing apparatus 1000 having received this command replies a response to this command to the client apparatus 2000. In the present embodiment, this response includes IRCutFilterOptions.

This IRCutFilterOptions describes information about a command that can be executed by the image-capturing apparatus 1000 from among the insertion command, the removal command, and the automatic insertion and removal command. Further, this IRCutFilterOptions describes information indicating adjustment parameters that can be executed (set) by the image-capturing apparatus 1000 from among adjustment parameters that can be described in the automatic insertion and removal command.

Subsequently, with a transaction of GetImagingSettings, the client apparatus 2000 can acquire the information indicating the state of the insertion and removal of the IRCF 4 into and from the optical path of the image-capturing optical system 2 from the image-capturing apparatus 1000.

The client apparatus 2000 transmits a command of GetImagingSettings to the address URI for using ImagingService of the image-capturing apparatus 1000. This command includes VideoSourceToken included in a response of GetVideoSource received from the image-capturing apparatus 1000.

On the other hand, the image-capturing apparatus 1000 having received this command replies a response to this command. In the present embodiment, this response includes IRCutFilter Settings.

This IRCutFilter Settings describes information indicating whether the IRCF 4 is currently inserted into the optical path of the image-capturing optical system 2 or the IRCF 4 is currently removed from this optical path. In the present embodiment, this IRCutFilterSettings describes information indicating that the IRCF 4 is currently inserted into the optical path of the image-capturing optical system 2.

Subsequently, with the transaction of SetImagingSettings, the client apparatus 2000 lets the image-capturing apparatus 1000 to automatically control the insertion and removal of the IRCF 4 into and from the optical path of the image-capturing optical system 2.

The client apparatus 2000 transmits a command of SetImagingSettings to the address URI for using ImagingSerives of the image-capturing apparatus 1000. This command includes VideoSourceToken included in a response of GetVideoSource received from the image-capturing apparatus 1000.

Further this command describes information indicating that the image-capturing apparatus 1000 is caused to automatically control the insertion and removal of the IRCF 4 into and from the optical path of the image-capturing optical system 2 (IrCutFilter field of which value is "AUTO"). In addition, this command describes adjustment parameter (IrCutFilterAutoAdjustment field).

IrCutFilter field and IrCutFilterAutoAdjustment field will be explained later.

On the other hand, the image-capturing apparatus 1000 having received this command replies a response of SetImagingSettings to the client apparatus 2000. The arguments of this response are omitted. In this case, this response of which arguments are omitted indicate the image-capturing apparatus 1000 successfully executed this command.

Accordingly, the image-capturing apparatus 1000 automatically determines whether the IRCF 4 is to be inserted into the optical path of the image-capturing optical system 2 or the IRCF 4 is to be removed from the optical path of the image-capturing optical system 2.

Figure 6:
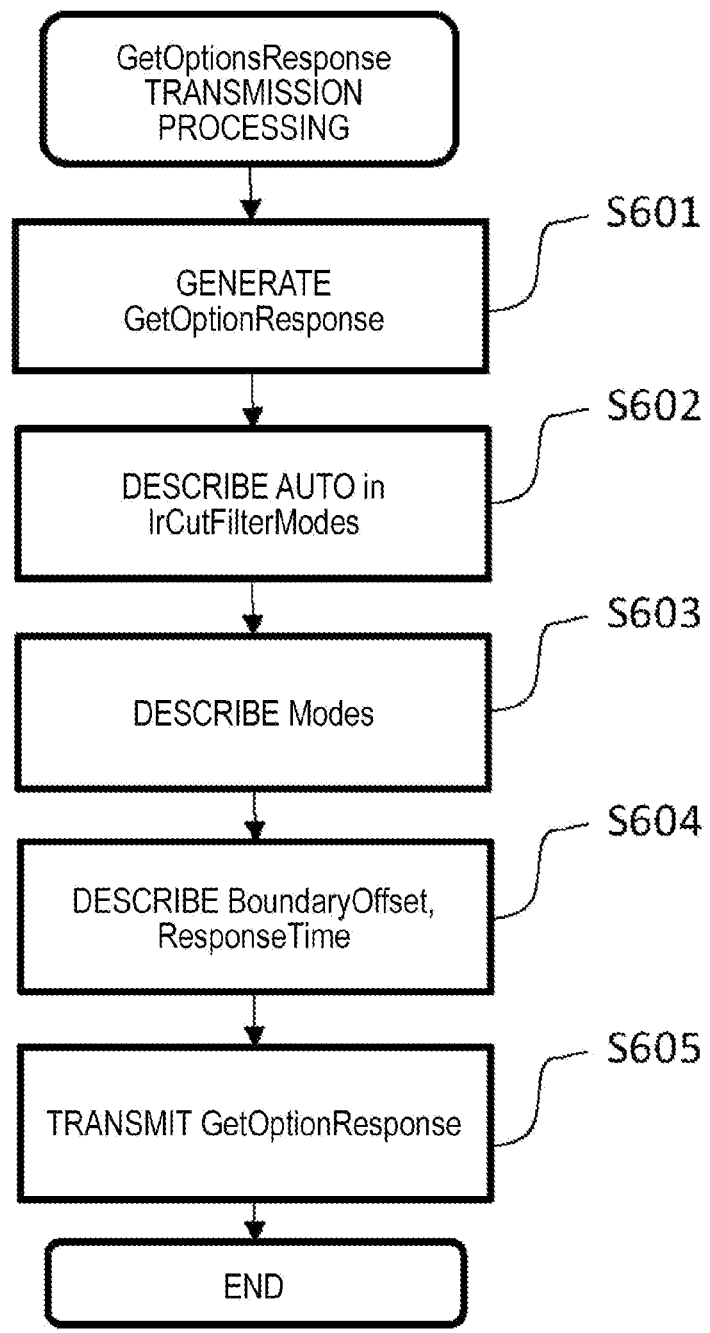
FIG. 6 is a flowchart for explaining at least one embodiment of GetOptionsResponse transmission processing according to the first embodiment of the present inventions.

Subsequently, FIG. 6 is a flowchart for explaining GetOptionsResponse transmission processing in the image-capturing apparatus 1000 according to the present embodiment. It should be noted that this processing is executed by the CPU 26. When the CPU 26 receives a command of GetOptions from the client apparatus 2000 via the I/F 14, the CPU 26 starts executes of this processing.

Hereinafter, the flowchart shown in FIG. 6 will be explained with reference to FIG. 7A as necessary. In this case, FIG. 7A is a figure illustrating an example of GetOptionsResponse transmitted in GetOptionsResponse transmission processing of FIG. 6.

In step S601, the CPU 26 generates GetOptionsResponse and stores the generated response of GetOptions to the EEPROM 28.

In step S602, the CPU 26 sets the value of IrCutFilterModes field of GetOptionsResponse stored to the EEPROM 28 in step S601 to ON, OFF, and AUTO.

Therefore, as shown in FIG. 7A, three <img20:IrCutFilterModes> tags are associated with <ImagingOptions20> tag in GetOptionsResponse. Further, the three <Img20:IrCutFilterModes> tags are associated with ON, OFF, and AUTO.

It should be noted that IrCutFilterModes field of which value is ON indicates that the image-capturing apparatus 1000 is ready to receive an insertion instruction command. IrCutFilterModes field of which value is OFF indicates that the image-capturing apparatus 1000 is ready to receive a removal instruction command. Further, IrCutFilterModes field of which value is AUTO indicates that the image-capturing apparatus 1000 is ready to receive an automatic insertion and removal command.

In step S603, the CPU 26 can set the value of Mode field of GetOptionsResponse stored to the EEPROM 28 in step S601 to Common, ToOn, and ToOff.

Accordingly, as shown in FIG. 7A, three <Img20:Mode> tags are associated with <IrCutFilterAutoAdjustmentOptions> tag in GetOptionsResponse. Further, the three <Img20:Mode> tags are associated with Common, ToOn, ToOff. In this case, FIG. 7B indicates a case where the item that can be set in the image-capturing apparatus 1000 according to the present embodiment is only Common.

It should be noted that Mode field of which value is ToOn indicates that an adjustment parameter can be used for the image-capturing apparatus 1000 to determine whether the IRCF 4 is to be inserted into the optical path of the image-capturing optical system 2. Mode field of which value is ToOff indicates that an adjustment parameter can be used for the image-capturing apparatus 1000 to determine whether the IRCF 4 is to be removed from the optical path of the image-capturing optical system 2.

Further, Mode field of which value is Common indicates that an adjustment parameter can be commonly used for the image-capturing apparatus 1000 to determine whether the IRCF 4 is to be inserted into the optical path of the image-capturing optical system 2 and to determine whether the IRCF 4 is to be removed from the optical path.

For example, GetOptionsResponse describing Mode field of which value is Common and not describing Mode field of which value is ToOn and Mode field of which value is ToOff indicates the following facts.

More specifically, this means that the adjustment parameter used by the image-capturing apparatus 1000 can be commonly set for both of the cases where the IRCF 4 is inserted into the optical path of the image-capturing optical system 2 and the IRCF 4 is removed from the optical path of the image-capturing optical system 2.

For example, GetOptionsResponse not describing Mode field of which value is Common and describing Mode field of which value is ToOn and Mode field of which value is ToOff indicates the following facts.

More specifically, this means that the adjustment parameter used by the image-capturing apparatus 1000 can be separately set for the case where the IRCF 4 is inserted into the optical path of the image-capturing optical system 2 and the case where the IRCF 4 is removed from the optical path of the image-capturing optical system 2.

In step S604, the CPU 26 sets the value of BoundaryOffset field of GetOptionsResponse stored to the EEPROM 28 in step S601 to true. Further, the CPU 26 sets the value of Min field of GetOptionsResponse stored to the EEPROM 28 in step S601 to PT 0S, and sets the value of Max field of this response to PT 30M.

Therefore, as shown in FIG. 7A, <img20:BoundaryOffset> tag is associated with <IrCutFilterAutoAdjustmentOptions> tag in GetOptionsResponse. Further, <img20:ResponseTime> tag is associated with <IrCutFilterAutoAdjustmentOptions> tag.

True is associated with <img20:BoundaryOffset> tag. In addition, <img20:Min> tag and <img20:Max> tag are associated with <img20:ResponseTime> tag. In this case, PT 0S is associated with <img20:Min> tag. PT 30M is associated with <img20:Max> tag.

BoundaryOffset field of which value is true indicates that BoundaryOffset can be set in the image-capturing apparatus 1000. <img20:Min> tag indicates the minimum value (shortest time) of the time that can be set in ResponseTime field. <img20:Max> tag indicates the maximum value (longest time) of the time that can be set in ResponseTime field.

More specifically, <img20:Min> and <img20:Max> indicate a range of time that can be set in ResponseTime field.

In step S605, the CPU 26 instructs the I/F 14 to transmit GetOptionsResponse stored in the EEPROM 28 in step S601 to the client apparatus 2000. FIG. 6 has been hereinabove explained. In the following explanation, as shown in FIG. 7B, an example of an image-capturing apparatus in which IrCutFilterAutoAdjustmentOption can be set to only Common will be explained as the present embodiment.

Subsequently, FIGS. 8A and 8B are figures illustrating an example of a configuration of SetImagingSettings command. In SetImagingSettings as shown in FIG. 8A, AUTO is set to the value of IrCutFilter field. More specifically, in the command of SetImagingSettings, AUTO is associated with <IrCutFilter> tag.

Therefore, the command of SetImagingSettings as shown in FIG. 8A corresponds to an automatic insertion and removal command for causing the image-capturing apparatus 1000 to automatically control the insertion and removal of the IRCF 4 into and from the optical path of the image-capturing optical system 2.

In the command of SetImagingSettings as shown in FIG. 8A, the value of BoundaryType field is set to Common.

More specifically, in the command of SetImagingSettings, <BoundaryType> tag is associated with <IrCutFilterAutoAdjustment> tag. Further, the value of Common is associated with <BoundaryType> tag.

In the command of SetImagingSettings as shown in FIG. 8A, the value of BoundaryOffset field is set to 0.52.

More specifically, in the command of SetImagingSettings, <BoundaryOffset> tag is associated with <IrCutFilterAutoAdjustment> tag. Further, 0.52 is associated with <BoundaryOffset> tag.

Further, in the command of SetImagingSettings as shown in FIG. 8A, PT 1M 15S is set in the value of ResponseTime field.

More specifically, in the command of SetImagingSettings, <ResponsTime> tag is associated with <IrCutFilterAutoAdjustment> tag. PT 1M 15S is associated with <ResponsTime> tag.

Therefore, SetImagingSettings command as shown in FIG. 8A can be said to be a command for instructing the image-capturing apparatus 1000 to do as follows. More specifically, this means that the value of BounaryOffset field and the value of ResponseTime field are commonly used by the image-capturing apparatus 1000 in each of the cases where the IRCF 4 is inserted into the optical path of the image-capturing optical system 2 and the IRCF 4 is removed from the optical path.

Subsequently, in SetImagingSettings as shown in FIG. 8B, AUTO is set in the value of IrCutFilter field. More specifically, in the command of SetImagingSettings, AUTO is associated with <IrCutFilter> tag.

In the command of SetImagingSetting as shown in FIG. 8B, two IrCutFilterAutoAdjustment fields are described. In this case, the value of BoundaryType field in the first IrCutFilterAutoAdjustment field is set to ToOn.

More specifically, in the command of SetImagingSettings, <BoundaryType> tag is associated with the first <IrCutFilterAutoAdjustment> tag. ToOn is associated with <BoundaryType> tag.

In the command of SetImagingSettings as shown in FIG. 8B, the value of BoundaryOffset field of the first IrCutFilterAutoAdjustment field is set to 0.16.

More specifically, in the command of SetImagingSettings, <BoundaryOffset> tag is associated with the first <IrCutFilterAutoAdjustment> tag. 0.25 is associated with <BoundaryOffset> tag.

Further, in the command of SetImagingSettings as shown in FIG. 8B, the value of ResponseTime in the first IrCutFilterAutoAdjustment field is set to PT 1M 30S.

Subsequently, in the command of SetImagingSettings as shown in FIG. 8B, the value of BoundaryType field of the second IrCutFilterAutoAdjustment field is set to ToOff.

More specifically, in the command of SetImagingSettings, <BoundaryType> tag is associated with the second <IrCutFilterAutoAdjustment> tag. ToOff is associated with <BoundaryType> tag.

In the command of SetImagingSettings as shown in FIG. 8B, the value of BoundaryOffset field of the second IrCutFilterAutoAdjustment field is set to 0.25.

More specifically, in the command of SetImagingSettings, <BoundaryOffset> tag is associated with the second <IrCutFilterAutoAdjustment> tag. 0.25 is associated with <BoundaryOffset> tag.

In the command of SetImagingSettings as shown in FIG. 8B, the value of ResponseTime field of the second IrCutFilterAutoAdjustment field is set to PT 1M 10S.

More specifically, in the command of SetImagingSettings, <ResponseTime> tag is associated with the second <IrCutFilterAutoAdjustment> tag. PT 1M 10S is associated with <ResponseTime> tag.

Therefore, SetImagingSettings command as shown in FIG. 8B can be said to be a command for instructing the image-capturing apparatus 1000 to do as follows. More specifically, this means that the value of BounaryOffset field and the value of ResponseTime field can be separately used for the image-capturing apparatus 1000 in each of the cases where the IRCF 4 is inserted into the optical path of the image-capturing optical system 2 and the IRCF 4 is removed from the optical path.

As described above, in the command of SetImagingSettings as shown in FIG. 8B, the value of BoundaryOffset field corresponding to BoundaryType field of which value is ToOn is 0.16. In the command of SetImagingSettings as shown in FIG. 8B, the value of BoundaryOffset field corresponding to BoundaryType field of which value is ToOff is 0.25.

More specifically, the value of BoundaryOffset field corresponding to BoundaryType field of which value is ToOn is less than the value of BoundaryOffset field corresponding to BoundaryType field of which value is ToOff.

Figure 9:
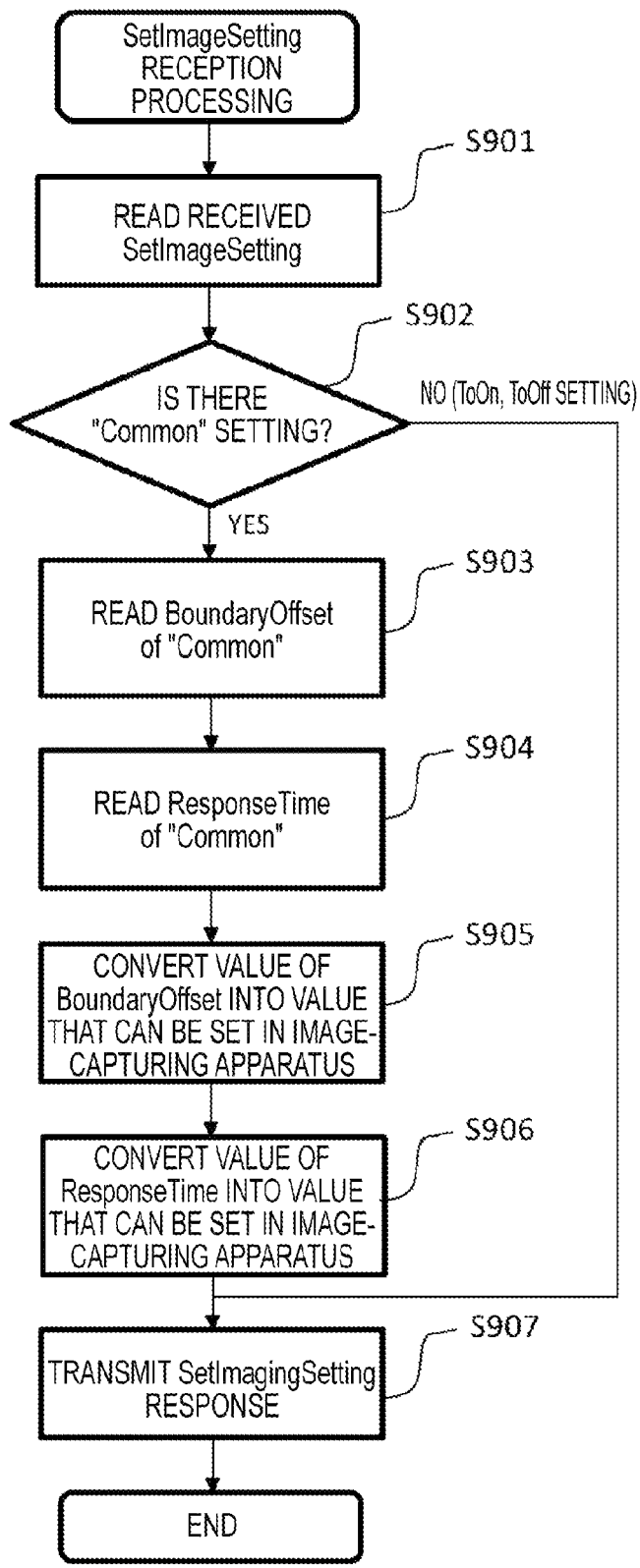
FIG. 9 is a flowchart for explaining at least one embodiment of SetImagingSettings reception processing according to the first embodiment of the present inventions.

Subsequently, FIG. 9 is a flowchart for explaining SetImagingSettings reception processing in the image-capturing apparatus 1000 according to the present embodiment.

It should be noted that this processing is executed by the CPU 26. When the CPU 26 receives a command of SetImagingSettings from the client apparatus 2000 via the I/F 14, the CPU 26 starts to execute this processing. The command of SetImagingSettings received by the I/F 14 is stored to the EEPROM 28.

In step S901, the CPU 26 reads the command of SetImagingSettings from the EEPROM 28.

In step S902, the CPU 26 determines whether a values is described in BoundaryType field of Common in the command read in step S901.

When the CPU 26 determines that a value is described in BoundaryType field of Common, the CPU 26 proceeds to processing in step S903. On the other hand, when the CPU 26 determines that no value is described in BoundaryType field of Common, the CPU 26 proceeds to processing in step S907.

When the CPU 26 determines that a value is described in BoundaryType field of ToOn or ToOff in the command read in step S901, the CPU 26 may proceed to processing in step S907.

The CPU 26 according to the present embodiment corresponds to a description determination unit for determining whether brightness values are described for a case where the IRCF 4 is inserted into the optical path of the image-capturing optical system 2 and a case where the IRCF 4 is removed from the optical path.

In step S903, the CPU 26 reads the value of BoundaryOffset field corresponding to BoundaryType field of which value is Common in the command read in step S901. In the case of the command as shown in FIG. 8A, the CPU 26 reads 0.52 as the value of BoundaryOffset field corresponding to BoundaryType field of which value is Common.

In step S904, the CPU 26 reads the value of ResponseTime field corresponding to BoundaryType field of which value is Common in the command read in step S901. In a case of the command as shown in FIG. 8A, the CPU 26 reads 1M 15S as the value of ResponseTime corresponding to BoundaryType field of which values is Common.

In step S905, the CPU 26 convers the values read in step S903 into BoundaryOffset value that can be set in the image-capturing apparatus 1000. BoundaryOffset value that can be set in the image-capturing apparatus 1000 indicates a value that can be set in the image-capturing apparatus 1000 determined in advance. For example, FIG. 10A shows a value that can be set in the image-capturing apparatus 1000 according to the present embodiment. FIG. 10A indicates that BoundaryOffset values that can be set in the image-capturing apparatus 1000 are five types, i.e., −1.0, −0.5, 0, 0.5, 1. In this case, in FIG. 8A, 0.52 is tried to be set in BoundaryOffset value. As described above, when a value that does not exist in BoundaryOffset value that can be set in FIG. 10A is tried to be set, BoundaryOffset value of the request is converted. An example of method for conversion includes a method for converting a value according to a table set in advance as shown in FIG. 10B.

In step S906, the CPU 26 converts the value read in step S904 into ResponseTime value that can be set in the image-capturing apparatus 1000. ResponseTime value that can be set in the image-capturing apparatus 1000 means a value that can be set in the image-capturing apparatus 1000 determined in advance. For example, FIG. 11A shows a value that can be set in the image-capturing apparatus 1000 according to the present embodiment. For example, FIG. 11A indicates that ResponseTime values that can be set in the image-capturing apparatus 1000 are five types, i.e., 1S, 10S, 30S, 1M, 3M. In this case, in FIG. 8A, 1M 15S is tried to be set in ResponseTime value. As described above, when a value that does not exist in ResponseTime value that can be set in FIG. 11A is tried to be set, ResponseTime value of the request is converted. An example of method for conversion includes a method for converting a value according to a table set in advance as shown in FIG. 11B.

In step S908, the CPU 26 instructs the I/F 14 to transmit a response of SetImagingSettings to the client apparatus 2000. In the present embodiment, the settings given by the client apparatus 2000 are reflected in the image-capturing apparatus 1000 according to the above procedure.

The preferred embodiment of the present inventions has been hereinabove explained, but the present inventions are not limited to the embodiment, and can be modified and changed in various manners within the range of the gist thereof.

Each of the functional blocks or several functional blocks of the above embodiment may not be necessarily separate pieces of hardware. For example, the functions of several functional blocks may be executed by a single hardware. The function of a single functional block or the functions of multiple functional blocks may be executed by cooperated operation of multiple pieces of hardware.

The above embodiment can also be achieved in a software manner by using a computer (or CPU, MPU, or the like) of a system or an apparatus. Therefore, a computer program itself provided to the computer in order to cause the computer to achieve the above embodiment also achieves one or more embodiments of the present inventions. More specifically, the computer program itself for achieving the functions of the above embodiment is also a form of the present inventions.

The computer program for achieving the above embodiment may be in any form as long as it can be read by the computer. It can be constituted by, for example, an object code, a program executed by an interpreter, script data provided to an OS, and the like, but it is not limited thereto. The computer program for achieving the above embodiment is provided to the computer by means of a storage medium or a wired/wireless communication. Examples of storage media for providing the program include magnetic storage media such as a flexible disk, a hard disk, and a magnetic tape, an optical or magneto-optical storage media such as an MO, a CD, and a DVD, and nonvolatile semiconductor memory.

A method for providing the computer program using a wired/wireless communication includes a method using a server on a computer network. In this case, a program file that can be a computer program forming the present invention(s) is stored to a server. The program file may be either an executable format or a source code. The client computer that accesses the server is provided with the program file by downloading the program file. In this case, the program file is divided into multiple segment files, and the segment files can be distributed and arranged in different servers. More specifically, the server apparatus providing the program file to the client computer for achieving the above embodiment may also be means for carrying out the present inventions.

It may also be possible to distribute a storage medium encrypting and storing a computer program for achieving the above embodiment, provide key information for decryption to a user who satisfies a predetermined condition, and allow the user to install the computer program to a computer which the user possesses. The key information can be provided by allowing the user to, e.g., download it from a homepage via the Internet. The computer program achieving the above embodiment may make use of the functions of the OS running on the computer. Further, a part of the computer program achieving the above embodiment may be constituted by, e.g., a firmware such as an expansion board attached to the computer, or may be configured to be executed by a CPU provided in the expansion board and the like.

According to the present inventions, on the basis of the setting of the insertion and removal of the infrared light cut filter into and from the optical path of the image-capturing optical system and set by an external apparatus, this insertion and removal can be appropriately controlled. In addition, the setting of the insertion and removal of the infrared light cut filter into and from the optical path of the image-capturing optical system can be appropriately set by the external apparatus.

Other Embodiments

Embodiments of the present inventions can also be realized by a computer of a system or apparatus that reads out and executes computer executable instructions recorded on a storage medium (e.g., non-transitory computer-readable storage medium) to perform the functions of one or more of the above-described embodiment(s) of the present inventions, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present inventions have been described with reference to exemplary embodiments, it is to be understood that the inventions are not limited to the disclosed exemplary embodiments. The scope of the following claims is to be accorded the broadest interpretation so as to encompass all such modifications and equivalent structures and functions.

This application claims the benefit of Japanese Patent Application No. 2014-045626, filed Mar. 7, 2014, which is hereby incorporated by reference herein in its entirety.

What is claimed is:

1. An image-capturing apparatus communicating with a client apparatus via a network, comprising:
    an image-capturing unit configured to capture an image of a subject;
    an infrared light cut filter configured to cut off infrared light;
    an insertion and removal unit configured to insert and remove the infrared light cut filter to and from an optical path of the image-capturing unit;
    a reception unit configured to receive, from the client apparatus via a network, an adjustment command capable of describing values including a condition of the insertion and removal of the infrared light cut filter and a delay time for the insertion and removal of the infared light cut filter; and
    a conversion unit configured to convert the values included in the adjustment command into values that can be set in the image-capturing apparatus.

2. The image-capturing apparatus according to claim 1, wherein the conversion unit includes a table for converting the values into values that can be set in the image-capturing apparatus.

3. The image-capturing apparatus according to claim 1, wherein the conversion unit converts the values in a predetermined range included in the adjustment command into constant values.

4. The image-capturing apparatus according to claim 1, wherein the adjustment command is capable of separately describing the values in each of the cases where the infrared light cut filter is inserted into the optical path and the infrared light cut filter is removed from the optical path.

5. The image-capturing apparatus according to claim 1, wherein the insertion and removal unit inserts or removes the infrared light cut filter based on the values converted by the conversion unit.

6. A control method for an image-capturing apparatus communicating with a client apparatus via a network, comprising:
    capturing an image of a subject by an image capturing unit of the image-capturing apparatus;
    inserting and removing an infrared light cut filter of the image-capturing apparatus to and from an optical path of the image capturing unit;
    receiving, from the client apparatus via a network, an adjustment command capable of describing values including a condition of the insertion and the removal of the infrared light cut filter and a delay time insertion and the removal of the infrared light cut filter; and
    converting the values included in the adjustment command into values that can be set in the image-capturing apparatus.

7. The control method according to claim 6, wherein the image-capturing apparatus includes a table for converting the values into values that can be set in the image-capturing apparatus.

8. The control method according to claim 6, wherein the values in a predetermined range included in the adjustment command are converted into constant values by the converting.

9. The control method according to claim 6, wherein the adjustment command is capable of separately describing the values in each of the cases where the infrared light cut filter is inserted into the optical path and the infrared light cut filter is removed from the optical path.

10. A non-transitory computer-readable storage medium storing a computer program for causing a computer to execute the control method for an image-capturing apparatus according to claim 6.

* * * * *